(12) United States Patent
Sanborn et al.

(10) Patent No.: US 11,053,145 B2
(45) Date of Patent: Jul. 6, 2021

(54) APPARATUS FOR TREATING PHARMACEUTICAL WASTE

(71) Applicant: Clear River Enviro, LLC, Sugar Land, TX (US)

(72) Inventors: Michael Sanborn, Carrolton, TX (US); Todd McGee, Mesa, AZ (US); Mark Macdonell, Sugarland, TX (US); Scott Kosch, Austin, TX (US)

(73) Assignee: Clear River Enviro, LLC, Sugar Land, TX (US)

( * ) Notice: Subject to any disclaimer, the term of this patent is extended or adjusted under 35 U.S.C. 154(b) by 180 days.

(21) Appl. No.: 16/102,346

(22) Filed: Aug. 13, 2018

(65) Prior Publication Data

US 2018/0346359 A1 Dec. 6, 2018

Related U.S. Application Data

(63) Continuation of application No. 14/650,796, filed as application No. PCT/US2013/076126 on Dec. 18, 2013, now Pat. No. 10,046,993.

(60) Provisional application No. 61/739,422, filed on Dec. 19, 2012.

(51) Int. Cl.
*C02F 1/68* (2006.01)
*C02F 1/72* (2006.01)
(Continued)

(52) U.S. Cl.
CPC .............. *C02F 1/722* (2013.01); *A62D 3/38* (2013.01); *C02F 1/686* (2013.01); *C02F 1/725* (2013.01);
(Continued)

(58) Field of Classification Search
CPC .. C02F 1/66; C02F 1/686; C02F 1/722; C02F 1/725; C02F 2101/34; C02F 2101/38;
(Continued)

(56) References Cited

U.S. PATENT DOCUMENTS

| 4,693,833 A | 9/1987 | Toshikuni et al. |
| 5,538,636 A | 7/1996 | Gnann et al. |

(Continued)

FOREIGN PATENT DOCUMENTS

| DE | 43 14 521 C2 | 11/1994 |
| JP | S51-002252 | 1/1976 |

(Continued)

OTHER PUBLICATIONS

Tekin et al., "Use of Fenton oxidation to improve the biodegradability of a pharmaceutical wastewater," Journal of Hazardous Materials, vol. 136, No. 2, Aug. 21, 2006, pp. 258-265.

*Primary Examiner* — Lucas A Stelling
(74) *Attorney, Agent, or Firm* — Foley & Lardner LLP

(57) ABSTRACT

A compact system for treating pharmaceutical waste at a location at which the pharmaceutical waste is disposed includes a housing having a door. The housing contains a waste influent tank configured to hold and discharge a fluid comprising pharmaceutical waste; a first container configured to hold and discharge hydrogen peroxide utilized in a chemical reaction to treat the pharmaceutical waste; a second container configured to hold and discharge aqueous iron solution utilized in the chemical reaction to treat the pharmaceutical waste; and a neutralizer tank in which the chemical reaction is carried out. The door of the housing is configured to move between an open position and a closed position to allow or deny access to an interior of the housing.

16 Claims, 10 Drawing Sheets

(51) Int. Cl.
    *A62D 3/38*     (2007.01)
    *C02F 1/66*     (2006.01)
    *C02F 101/38*     (2006.01)
    *C02F 101/34*     (2006.01)
    *C02F 103/34*     (2006.01)

(52) U.S. Cl.
    CPC ............ *C02F 1/66* (2013.01); *C02F 2101/34* (2013.01); *C02F 2101/38* (2013.01); *C02F 2103/343* (2013.01); *C02F 2301/046* (2013.01); *C02F 2305/026* (2013.01)

(58) Field of Classification Search
    CPC .......... C02F 2103/343; C02F 2301/046; C02F 2305/026; A62D 3/38
    USPC ....................................................... 588/320
    See application file for complete search history.

(56) References Cited

U.S. PATENT DOCUMENTS

| | | |
|---|---|---|
| 6,143,182 A | 11/2000 | Huang et al. |
| 6,379,538 B1 | 4/2002 | Corlett et al. |
| 7,220,360 B2 | 5/2007 | Chen et al. |
| 7,662,294 B1 | 2/2010 | Cox, Jr. |
| 7,666,315 B2 | 2/2010 | Lopez Martinez et al. |
| 2006/0175266 A1 | 8/2006 | Rima et al. |
| 2007/0256979 A1 | 11/2007 | Condit |
| 2008/0035583 A1 | 2/2008 | Lopez Martinez et al. |
| 2009/0134074 A1 | 5/2009 | Doran |
| 2009/0250404 A1 | 10/2009 | Berkowitz et al. |
| 2011/0049061 A1 | 3/2011 | Hale et al. |
| 2011/0247985 A1 | 10/2011 | Theodore |
| 2012/0305132 A1* | 12/2012 | Maness ............... A61J 1/14 141/69 |

FOREIGN PATENT DOCUMENTS

| | | |
|---|---|---|
| JP | 52-111265 | 9/1977 |
| JP | H03-278899 | 12/1991 |
| JP | 2002-119977 A | 4/2002 |
| JP | 2004-223351 A | 8/2004 |
| JP | 2009-297708 A | 12/2009 |
| JP | 2011-206626 A | 10/2011 |
| WO | WO-2006/109043 A1 | 10/2006 |
| WO | WO-2012/025943 | 3/2012 |

* cited by examiner

APPARATUS FOR TREATING PHARMACEUTICAL WASTE

CROSS-REFERENCE TO RELATED APPLICATIONS

This application is a continuation of U.S. patent application Ser. No. 14/650,796, filed on Jun. 9, 2015, which is a 371 National Phase Application of PCT/US2013/076126, filed Dec. 18, 2013, which claims the benefit of U.S. Provisional Application No. 61/739,422 filed on Dec. 19, 2012, which are hereby incorporated by reference in their entireties.

FIELD

The present disclosure is generally related to degrading and eliminating concentrations of drugs from water. More specifically, the disclosure relates to a compact drainage system and method for treating, at a location of disposal, pharmaceutical waste contained in waste water.

BACKGROUND

Waste water contamination is an important issue, especially in hospital, dental, home care and other settings where pharmaceutical waste is commonly discarded. Healthcare workers or patients often dispose of pharmaceutical waste incorrectly, often unintentionally, which can lead to contaminated waste water. For example, items that contain toxic chemicals are routinely poured down sinks or flushed down toilets. Since most waste water treatment facilities do not specifically treat for these chemicals, this can lead to problems of pollution if pharmaceutical waste makes its way into public water supplies.

The EPA has identified 1,500 publicly owned treatment works ("POTWs") that are required to have a pretreatment program, and another 13,500 facilities that are not required to have a pretreatment program. Given the breadth of potential contaminants, the EPA focuses on the following waste materials: mercury, primarily from dental facilities, but also from some medical equipment devices; and unused pharmaceuticals. Unused pharmaceuticals include animal and human drugs such as wasted pills, excess liquid formulations (injectables and swallowed) and spilled biohazards. Current best management practices include incineration or disposal of the pharmaceutical waste in a solid-waste landfill. However, most pharmaceutical waste is still disposed by being poured down a sink.

Common pharmaceuticals that are considered "hazardous wastes" under the Resource Conservation and Recovery Act ("RCRA") include epinephrine, nitroglycerin, warfarin, nicotine, and many chemotherapy agents. These pharmaceutical waste items are subject to unique and expensive disposal requirements, since the EPA regulates the generation, storage, transportation, treatment, and disposal of any pharmaceutical waste defined as hazardous waste by RCRA.

SUMMARY

One embodiment relates to a compact system for treating pharmaceutical waste at a location at which the pharmaceutical waste is disposed. The system includes a waste influent tank configured to hold and discharge a fluid containing pharmaceutical waste, a first container configured to hold and discharge hydrogen peroxide utilized in a chemical reaction to treat the pharmaceutical waste, a second container configured to hold and discharge aqueous iron solution utilized in a chemical reaction to treat the pharmaceutical waste, a neutralizer tank in which the chemical reaction is carried out, and a drain container configured to receive treated fluid. The system excludes a UV light source. In some embodiments, the system is configured to be provided in a space beneath a sink. In other embodiments, the system is a contained system on a transportable cart.

Another embodiment relates to a method of treating pharmaceutical waste. The method includes providing pharmaceutical waste in a waste influent tank, providing hydrogen peroxide in a first container, providing aqueous iron solution in a second container, discharging the pharmaceutical waste, the hydrogen peroxide and the aqueous iron solution to a neutralizer tank, carrying out a chemical reaction between the pharmaceutical waste, the hydrogen peroxide and the aqueous iron solution within the neutralizer tank, and discharging a treated fluid to a drain container.

Yet another embodiment relates to a compact system for treating pharmaceutical waste at a location at which the pharmaceutical waste is disposed includes a housing having a door. The housing contains a waste influent tank configured to hold and discharge a fluid comprising pharmaceutical waste; a first container configured to hold and discharge hydrogen peroxide utilized in a chemical reaction to treat the pharmaceutical waste; a second container configured to hold and discharge aqueous iron solution utilized in the chemical reaction to treat the pharmaceutical waste; and a neutralizer tank in which the chemical reaction is carried out. The door of the housing is configured to move between an open position and a closed position to allow or deny access to an interior of the housing.

A further embodiment relates to a method of treating pharmaceutical waste including performing a treatment cycle. The treatment cycle includes providing pharmaceutical waste in a waste influent tank; providing hydrogen peroxide in a first container, the hydrogen peroxide configured to be utilized in a chemical reaction to treat the pharmaceutical waste; providing aqueous iron solution in a second container, the aqueous iron solution configured to be utilized in the chemical reaction to treat the pharmaceutical waste; discharging each of the pharmaceutical waste, the hydrogen peroxide and the aqueous iron solution to a neutralizer tank via independent supply lines; and carrying out a chemical reaction between the pharmaceutical waste, the hydrogen peroxide and the aqueous iron solution within the neutralizer tank. The waste influent tank, the first container, the second container and the neutralizer tank are provided in a housing having a door. The door of the housing is configured to move between an open position and a closed position to allow or deny access to an interior of the housing.

BRIEF DESCRIPTION OF THE DRAWINGS

The disclosure will become more fully understood from the following detailed description, taken in conjunction with the accompanying figures, in which.

DESCRIPTION

Figure 1:
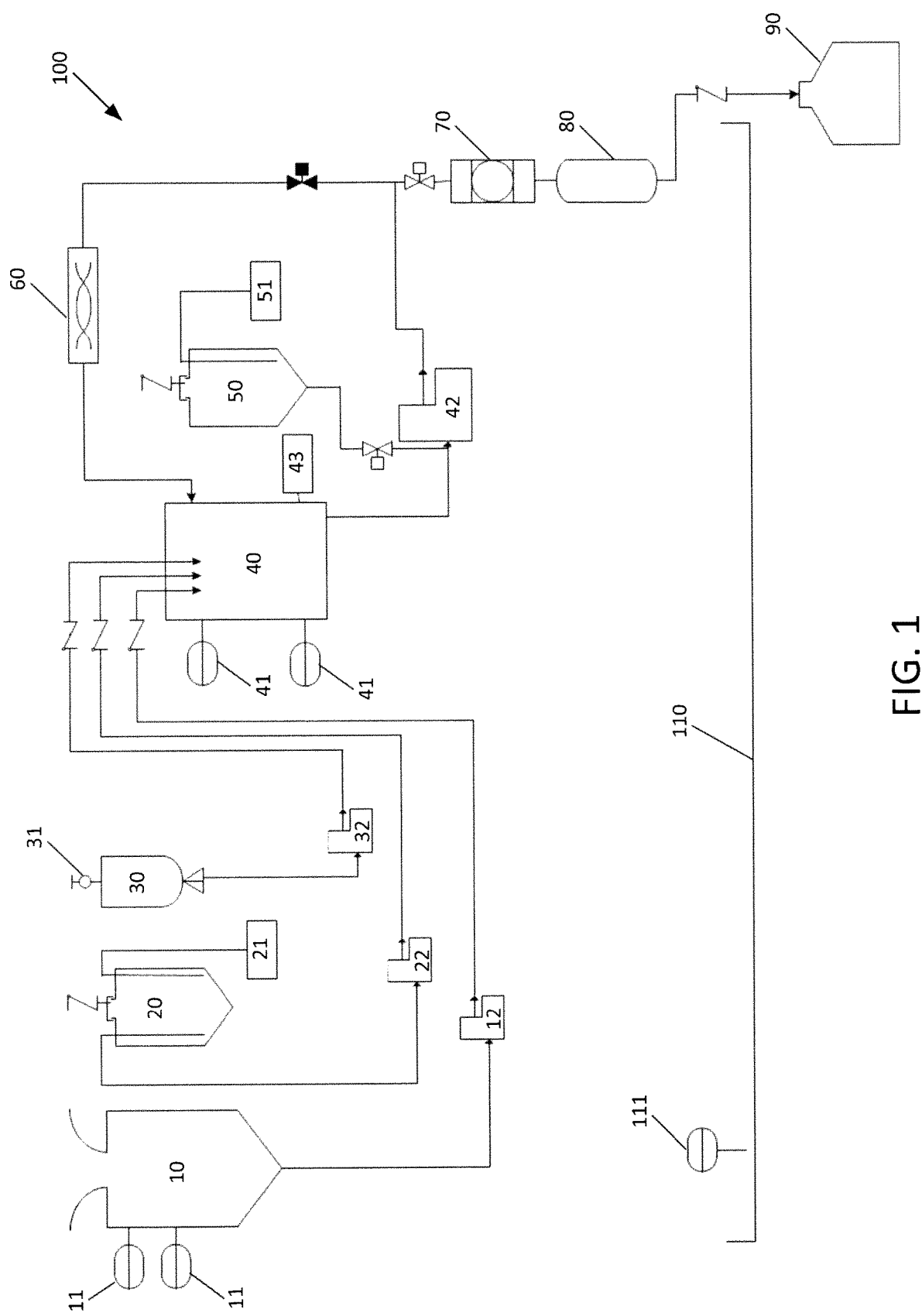
FIG. 1 is a schematic drawing of a compact drainage system for degrading and eliminating concentrations of drugs disposed by flushing, according to one embodiment.

A compact drainage system 100 includes a waste influent tank 10, a hydrogen peroxide container 20, an aqueous iron container 30, a neutralizer tank 40, a water container 50, a static flow mixer 60, a bulk filter 70, a carbon filter 80, and a drain container 90. At least some of the components of the compact drainage system 100 (e.g., the waste influent tank 10, the hydrogen peroxide container 20, the aqueous iron container 30, the neutralizer tank 40, the static flow mixer 60, the bulk filter 70 and/or the carbon filter 80) may be included in a housing 120 having a door 121 (see FIGS. 7 and 8). The housing 120 may be lifted up to allow complete access to the compact drainage system 100.

In one embodiment, the compact drainage system 100 has a size similar to that of a standard garbage disposal configured to fit under a sink. For example, the compact drainage system 100 may have a length of 19.89 inches (505 mm), a width of 15.17 inches (385 mm) and a height of 17.67 inches (449 mm). Alternatively, other dimensions may be used. The compact size of the compact drainage system 100 allows the compact drainage system 100 to treat pharmaceutical waste at a location at which the pharmaceutical waste is disposed (i.e., at a sink if the pharmaceutical waste is poured down the sink), and by a person that disposed of the pharmaceutical waste. Thus, the pharmaceutical waste will be treated on site, instead of offsite at a waste water treatment facility or publicly owned treatment works. This ensures that the appropriate procedures for degrading and eliminating the pharmaceutical waste are followed, and prevents pharmaceutical waste from being discharged into public water supplies. In another illustrative embodiment, the pharmaceutical waste may be treated at least in part via a Fenton reaction that occurs in the absence of ultraviolet (UV) light. In use, the compact drainage system 100 will utilize multiple pulses of Fenton's reagent per treatment cycle to achieve destruction of the pharmaceutical waste. The specifics of the Fenton reaction are described in more detail below.

The size of the compact drainage system 100 may be dictated by the space available and a desired life of the system components. Specifically, the smaller the size of the individual components, the more frequently the various components will have to be changed.

Referring now to FIGS. 1-8, the waste influent tank 10 is configured to collect pharmaceutical waste and introduce the pharmaceutical waste into the compact drainage system 100. The waste influent tank 10 is made of a suitable material that is impervious to the chemical compounds present in the pharmaceutical waste to be neutralized. For example, the waste influent tank 10 can be made of stainless steel, polyurethane, polyethylene or any other suitable material. The waste influent tank 10 can be any suitable shape. For example, the waste influent tank 10 can have a rectangular cross section or a spherical cross section. In one embodiment, a bottom portion of the waste influent tank 10 is conical or otherwise substantially funnel-shaped to allow the contents of the waste influent tank 10 to be introduced into the compact drainage system 100 at a controlled rate. The funnel of the waste influent tank 10 may be disposed, for example, at an opening in a top surface of the housing 120 such that pharmaceutical waste may be introduced to the waste influent tank even when the housing 120 is in a position covering the compact drainage system 100. The waste influent tank 10 may be of any size or shape, provided that there is free draining and the size and shape selected allow for the introduction of level sensors (described in further detail below) to report when a reaction quantity (i.e., a predetermined level of pharmaceutical waste) has been reached. For example, the reaction quantity may be 1 L, although other levels may be used.

The waste influent tank 10 may include at least one level sensor 11A configured to measure a level of fluid (i.e., water and pharmaceutical waste) poured down a sink drain. In one embodiment, the waste influent tank 10 has a first level sensor 11A and a second level sensor 11B. Any known level sensor may be utilized, provided that the level sensor is capable of functioning within a stainless steel tank, has a fast response time, and provides for minimal hysteresis. For example, the level sensors 11A and 11B may be a Cosense LL-01 level sensor.

In one embodiment, the level sensors 11A and 11B are capable of outputting an alarm signal to a control circuit 200 (described in more detail below) when a predetermined level of fluid has been reached. The alarm signal may trigger an interlock (not illustrated) that prevents additional fluid from being added to the waste influent tank 10 until the level of fluid within the waste influent tank 10 has been reduced below the predetermined level.

The waste influent tank 10 may optionally include a pre-filter or coarse screen (not illustrated) at an outlet of the waste influent tank 10 to prevent coarse matter, including, but not limited to, insoluble pharmaceutical waste, from entering the compact drainage system 100.

A first pump 12 is located downstream from the waste influent tank 10. The first pump 12 is configured to transport contents of the waste influent tank 10 to the neutralizer tank 40 at a predetermined rate. For example, the predetermined rate may be 600 mL/minute, although other rates may be used. A flow rate of the first pump 12 may be varied using software that allows the control circuit 200 to program flow rates in, for example, 0.01 mL increments. Therefore, the first pump 12 is capable of flow rate calibration across a broad spectrum of flow rates. The predetermined rate can depend on the size of the waste influent tank 10 and the overall size of the compact drainage system 100.

In one embodiment, the first pump 12 is activated automatically when the level sensor 11A and/or the level sensor 11B determines that contents of the waste influent tank 10 have reached a predetermined level (i.e., height within the waste influent tank 10). In another embodiment, the first pump 12 is activated manually by a user via the control circuit 200 (described in more detail below). The first pump 12 may be activated manually, for example, by a wall switch such as that typically used to activate lights, or by a foot pedal located adjacent to the compact drainage system 100. In yet another embodiment, the first pump 12 may be set to an "always on" mode of operation in which contents of the waste influent tank 10 are pumped to the neutralizer tank 40 immediately upon entering the waste influent tank 10. The "always on" mode of operation is beneficial for high volume pharmaceutical waste generating environments, such as a hospital. The first pump 12 may be powered by a battery or by a known, external power source.

The hydrogen peroxide container 20 is configured to hold and dispense hydrogen peroxide. In one embodiment, the hydrogen peroxide is 30% reagent grade hydrogen peroxide. A size of the hydrogen peroxide container 20 is dependent on a number of batches of Fenton's reagent utilized to treat concentrations of pharmaceutical waste. For example, the hydrogen peroxide container 20 may be capable of holding 500 mL of hydrogen peroxide. In an illustrative embodiment, the hydrogen peroxide container 20 is a glass or polyethylene container with a vented cap. The hydrogen peroxide container 20 may be hermetically sealed. The hydrogen peroxide container 20 may include a composite bar code, linear bar code or RFID in order to verify authenticity of the hydrogen peroxide container 20 and the contents thereof. The hydrogen peroxide container 20 may be stored, for example, in a compartment or on a shelf mounted on the door 121 of the housing 120. This configuration allows for easy access to the hydrogen peroxide container 20 to facilitate refill or replacement of the hydrogen peroxide container 20.

The hydrogen peroxide container 20 may include at least one pressure sensor 21 configured to measure a pressure of the hydrogen peroxide held in the hydrogen peroxide container 20. Any known pressure sensor may be utilized. The pressure sensor 21 is configured to determine fluid level in the hydrogen peroxide container 20. If there is insufficient fluid, the reaction will not progress, and the pharmaceutical waste will not be neutralized. Specifically, the pressure sensor 21 reports a fluid pressure at a bottom of the hydrogen peroxide container 20. In one embodiment, the pressure sensor 21 is capable of outputting an alarm signal to the control circuit 200 (described in more detail below) when a predetermined pressure level has been reached. When the predetermined pressure level has been reached, there is not adequate amounts of hydrogen peroxide present in the tank for the reaction to progress.

A second pump 22 is located downstream from the hydrogen peroxide container 20. The second pump 22 is configured to transport hydrogen peroxide from the hydrogen peroxide container 20 to the neutralizer tank 40 at a predetermined rate prescribed by a chemical reaction used to treat the pharmaceutical waste (described in more detail below). For example, the predetermined rate may be 50 mL/minute, although other rates may be used. A flow rate of the second pump 22 may be varied using software that allows the control circuit 200 to program flow rates in, for example, 0.01 mL increments. Therefore, the second pump 22 is capable of flow rate calibration across a broad spectrum of flow rates. The predetermined rate may depend on the overall size of the compact drainage system 100 and the rate of discharge from the waste influent tank 10.

The aqueous iron container 30 is configured to hold and dispense aqueous iron. The aqueous iron may be, for example, ferrous sulfate heptahydrate. In one embodiment, the aqueous iron container 30 is a plastic bag, similar to that used for intravenous (IV) therapy. The aqueous iron container 30 may be hermetically sealed to reduce the formation of a precipitate. A size of the aqueous iron container 30 is dependent on a number of batches of Fenton's reagent utilized to treat concentrations of pharmaceutical waste. For example, the aqueous iron container 30 may be capable of holding 250 mL to 1 L of aqueous iron. Alternatively, other capacities may be used. The aqueous iron container 30 may include a composite bar code, linear bar code or RFID in order to verify authenticity of the aqueous iron container 30 and the contents thereof. The aqueous iron container 30 may be stored, for example, in a compartment or on a shelf mounted on the door 121 of the housing 120. This configuration allows for easy access to the aqueous iron container 30 to facilitate refill or replacement of the aqueous iron container 30.

The aqueous iron container 30 may include at least one load cell 31 configured to measure a weight of the aqueous iron held in the aqueous iron container 30. Any known standard beam load scale may be utilized, for example, an Omega LCAE-1KG single point load cell. The load cell 31 may provide information on a volume of aqueous iron in the aqueous iron container 30. Specifically, in an embodiment in which the aqueous iron container 30 is a plastic bag, instead of a bottle, the load cell 31 is configured to determine if the aqueous iron container 30 has an adequate quantity (i.e., mass) of aqueous iron for the chemical reaction used to neutralize the pharmaceutical waste. In one embodiment, the load cell 31 is capable of outputting an alarm signal to the control circuit 200 (described in more detail below) when a predetermined load level has been reached.

A third pump 32 is located downstream from the aqueous iron container 30. The third pump 32 is configured to transport aqueous iron from the aqueous iron container 30 to the neutralizer tank 40 at a predetermined rate prescribed by the chemical reaction used to treat the pharmaceutical waste (described in more detail below). For example, the predetermined rate may be 50 mL/minute, although other rates may be used. A flow rate of the third pump 32 may be varied using software that allows the control circuit 200 to program flow rates in, for example, 0.01 mL increments. Therefore, the third pump 32 is capable of flow rate calibration across a broad spectrum of flow rates. The predetermined rate may depend on the overall size of the compact drainage system 100 and the rate of discharge from the waste influent tank 10. In one embodiment, flow rates of the second pump 22 and the third pump 32 are programmed such that a 1:3 ratio of hydrogen peroxide to aqueous iron is transported to the neutralizer tank 40.

The waste influent tank 10, the hydrogen peroxide container 20, and the aqueous iron container 30 are located in parallel to each other in an illustrative embodiment. Prior to entering the neutralizer tank 40, the fluid being discharged from the waste influent tank 10, the hydrogen peroxide container 20, and the aqueous iron container 30 pass through at least one check valve, such that the fluid cannot return to its respective source.

The chemical reaction used to treat the pharmaceutical waste takes place in the neutralizer tank 40. The neutralizer tank 40 is made of a suitable material that is impervious to the chemical compounds present in the pharmaceutical waste to be neutralized. For example, the neutralizer tank 40 can be made of stainless steel, polyethylene, fluorinated polyethylene, or any other suitable material. In an illustrative embodiment, the neutralizer is made of stainless steel for ease of placement of volume sensors, to be tolerant of any temperature excursion that occurs during the chemical reaction, and to be tolerant of any vigorous reaction.

The chemical reaction utilized to neutralize the pharmaceutical waste can be, for example, a chemical reaction that utilizes Fenton's reagent that occurs in the absence of ultraviolet (UV) light. One of ordinary skill in the art would appreciate that Fenton's reagent is a solution of hydrogen peroxide and an iron catalyst that is used to oxidize contaminants in waste waters. The hydrogen peroxide and the iron catalyst are provided by the hydrogen peroxide container 20 and the aqueous iron container 30, respectively, while the waste water (i.e., fluid containing pharmaceutical waste) is provided by the waste influent tank 10. The chemical reaction will be described in further detail below.

The neutralizer tank 40 may include at least one level sensor 41A configured to measure a level of fluid within the neutralizer tank 40. In one embodiment, the neutralizer tank 40 has a first level sensor 41A and a second level sensor 41B. The level sensor 41A and/or the level sensor 41B also serves to verify a volume of the neutralizer tank 40 before reagents are added from the hydrogen peroxide container 20 and the aqueous iron container 30, to confirm that the neutralizer tank 40 empties at an end of a cycle, and to verify that the neutralizer tank 40 is not partially full at a beginning of the cycle. Any known level sensor may be utilized. In one embodiment, the level sensors 41A and 41B are capable of outputting an alarm signal to the control circuit 200 (described in more detail below) when a predetermined level of fluid has been reached. The alarm signal may trigger an interlock (not illustrated) that prevents additional fluid from being added to the neutralizer tank 40 until the level of fluid within the neutralizer tank 40 has been reduced below the predetermined level.

The neutralizer tank 40 may also include a temperature sensor 43 configured to measure a temperature of the fluid within the neutralizer tank 40. The temperature sensor 43 may provide an indication of the rate at which the chemical reaction is taking place within the neutralizer tank 40.

A circulation pump 42 is located downstream from the neutralizer tank 40. The circulation pump 42 is configured to transport treated waste water from an outlet of the neutralizer tank 40 to the bulk filter 70. The circulation pump may also serve to mix the contents of the neutralizing tank 40 during a reaction or processing cycle. Once the reaction or processing cycle is complete, a valve opens to allow the circulation pump 42 to empty the neutralizing tank 40 to the filter array (e.g., bulk filter 70 and carbon filter 80). The control circuit 200 may be programmed to alter a pump speed of the circulation pump 42 in order to maximize exposure to a carbon filter 80. One of ordinary skill in the art will appreciate that a pump speed of any of the pumps described herein may be varied by the control circuit 200 in order to maximize exposure to the carbon filter 80.

Figure 7:
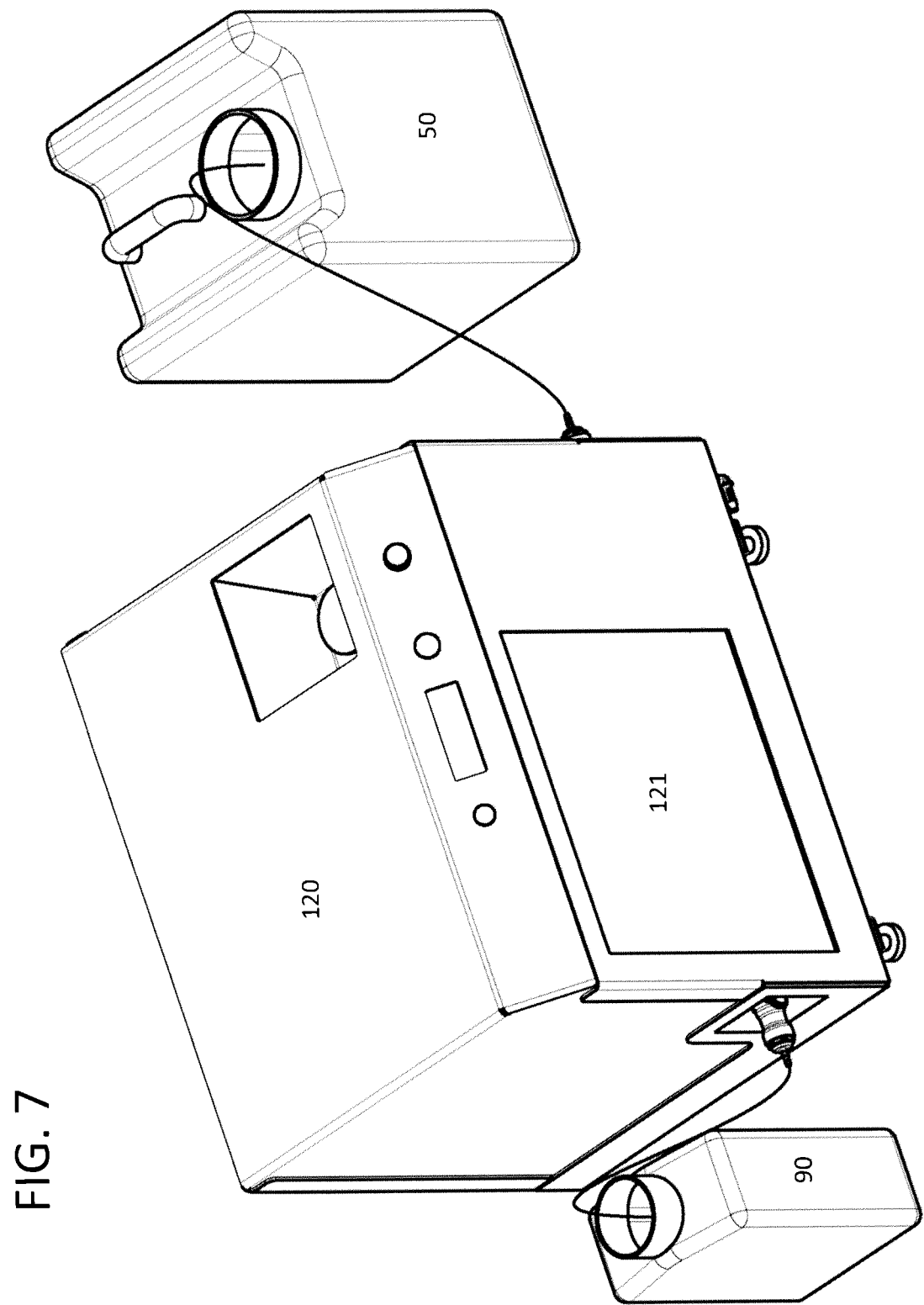
FIG. 7 is a front, perspective view of the compact drainage system with a housing having a closed door, according to the embodiment of FIG. 4.
Figure 8:
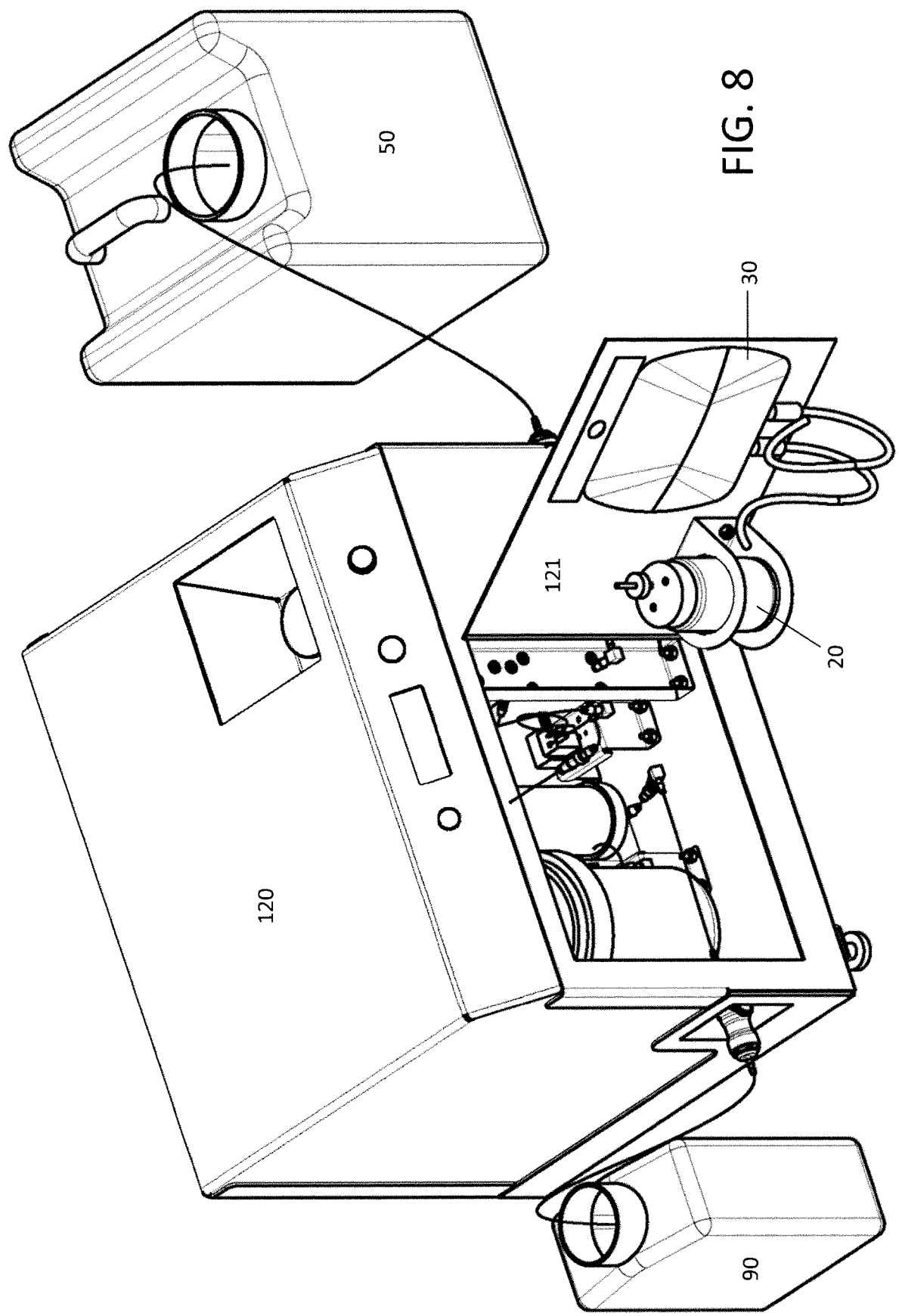
FIG. 8 is a front, perspective view of the compact drainage system with a housing having an open door, according to the embodiment of FIG. 4.

The compact drainage system 100 further includes a water container 50 configured to hold water. For example, the water container 50 may hold 2 L of water, although other volumes may be used. The water container 50 may include a fitting configured to connect to a water source such as a hospital water supply. In other embodiments, the water container 50 may be manually refilled. In some embodiments, the compact drainage system 100 utilizes a 1:1 ratio of pharmaceutical waste to water prior to beginning a reaction or treatment cycle. As illustrated in FIGS. 7 and 8, the water container 50 may be disposed external to the housing 120.

Figure 2:
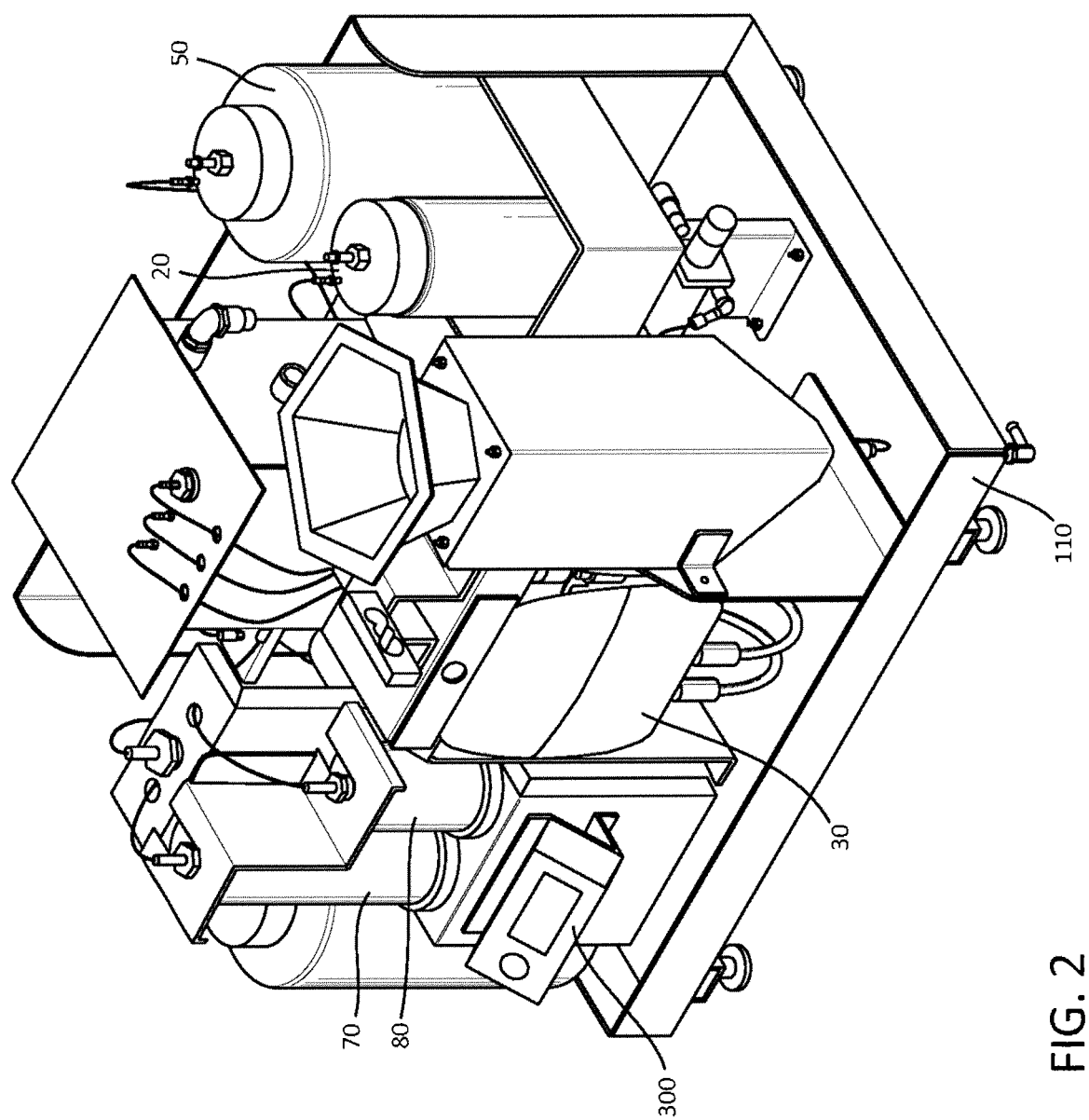
FIG. 2 is a front, perspective view of the compact drainage system, according to the embodiment of FIG. 1.
Figure 3:
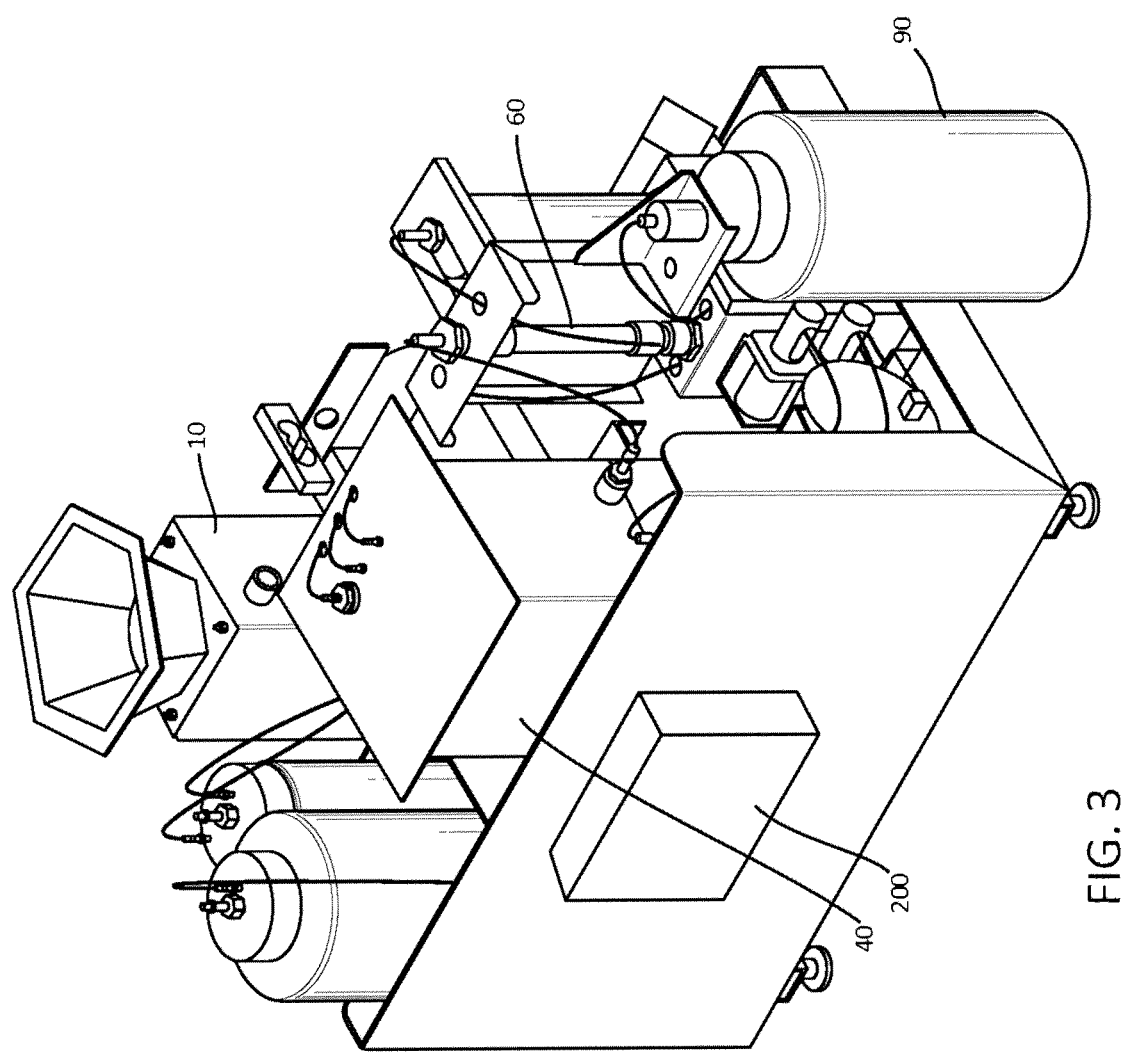
FIG. 3 is a back, perspective view of the compact drainage system, according to the embodiment of FIG. 1.
Figure 4:
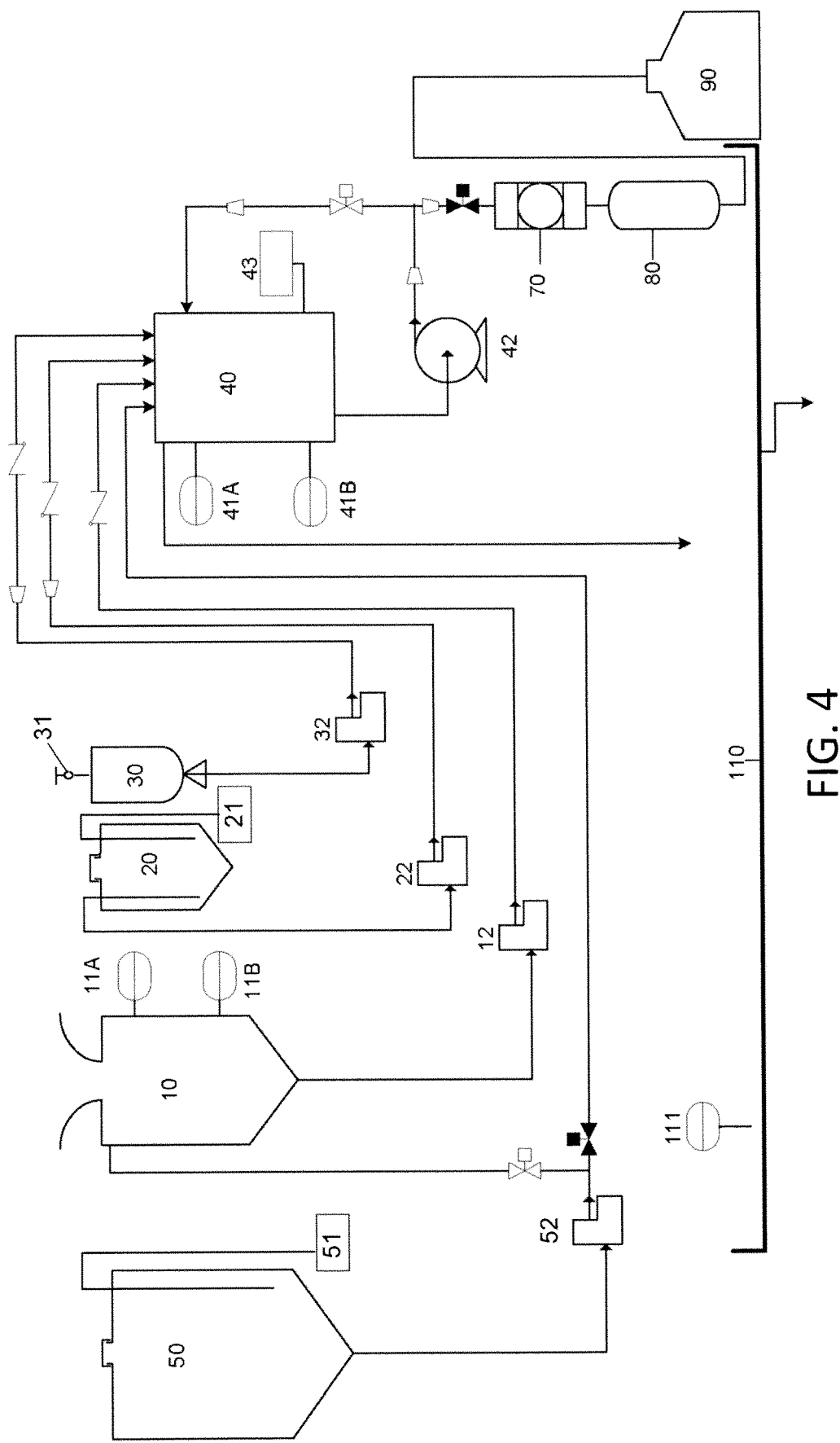
FIG. 4 is a schematic drawing of a compact drainage system for degrading and eliminating concentrations of drugs disposed by flushing, according to a second embodiment.

In one embodiment, as illustrated in FIGS. 1-3, the water container 50 is located upstream from the circulation pump 42, in parallel with the neutralizer tank 40. In addition, the water container 50 is configured to dispense water in a first pathway such that water can be circulated in a loop from the outlet of the neutralizer tank 40 to an inlet of the neutralizer tank 40, or in a second pathway such that water can be added to the treated waste water from the outlet of the neutralizer tank 40, to further dilute the treated waste water prior to being introduced to the bulk filter 70.

In another embodiment, as illustrated in FIGS. 4-8, the water container 50 is located upstream from the waste influent tank 10. A circulation pump 52 may be located downstream from the water container 50. The circulation pump 52 is configured to transport water from the water container 50 to either the waste influent tank 10 or the neutralizer tank 40 at a predetermined rate prescribed by a chemical reaction used to treat the pharmaceutical waste (described in more detail below) or an amount of water to be used in a cleaning cycle. For example, the predetermined rate may be 1200 mL/minute, although other rates may be used. A flow rate of the circulation pump 52 may be varied using software that allows the control circuit 200 to program flow rates in, for example, 0.01 mL increments. Therefore, the circulation pump 52 is capable of flow rate calibration across a broad spectrum of flow rates. The predetermined rate may depend on the overall size of the compact drainage system 100 and the rate of discharge from the waste influent tank 10.

In both embodiments, the water stored in the water container 50 may also be used to clean the compact drainage system 100. In one embodiment, a user can program the control circuit 200 such that the compact drainage system 100 automatically runs a cleaning cycle after each reaction cycle.

In both embodiments, the water container 50 may include a pressure sensor 51 configured to measure a pressure of the water held in the water container 50. Specifically, the pressure sensor 51 is used as a level sensor utilizing a pressure of the water at the bottom of the water container 50. In some embodiments, it is preferable to use a pressure sensor as opposed to a level sensor because a pressure sensor has no moving mechanical parts and provides a repeatable signal or result. Any known pressure sensor may be utilized. In one embodiment, the pressure sensor 51 is connected to a tube that runs from a cap of the water container 50 to a bottom of the water container 50. In one embodiment, the pressure sensor 51 is capable of outputting an alarm signal to the control circuit 200 (described in more detail below) when a predetermined pressure level has been reached.

In the embodiment of FIGS. 1-3, a static flow mixer 60 is configured to mix waste water discharged from the neutralizer tank 40 and water discharged from the water container 50. In some embodiments, the static flow mixer 60 may be omitted (not illustrated), provided that adequate mixing is achieved by the pumps. The static flow mixer 60 may be included to reduce the size of the compact drainage system 100 by allowing for the use of smaller or fewer pumps. In addition, the static flow mixer 60 may be included to ensure proper mixing of the hydrogen peroxide and the aqueous iron with the pharmaceutical waste in the neutralizer tank 40.

The static flow mixer 60 includes at least one mixer element enclosed in a housing. The mixer element may be, for example, a plurality of baffles or a single helical mixer. The static flow mixer 60 is disposed within the first pathway between the outlet of the neutralizer tank 40 and the inlet of the neutralizer tank 40, such that fluid being circulated from the outlet of the neutralizer tank 40 flows through the static flow mixer 60, prior to entering the inlet of the neutralizer tank 40.

In both embodiments, after the waste water is treated in the neutralizer tank 40, the circulation pump 42 may pump the treated waste water to the bulk filter 70, which is configured to filter any solid pharmaceutical waste or byproduct of the chemical reaction that took place in the neutralizer tank 40 that remains in the treated waste water. Any commercially available filter cartridge that has a high capacity may be utilized as the bulk filter 70. Specifically, the bulk filter 70 may be selected from the Pall catalog based on flow rate and contaminate particle size expected from the chemical reaction. The bulk filter 70 may be, for example, a high capacity polymer filter, a cloth filter, a paper filter, or a ceramic filter. In one example, the bulk filter 70 a 5 micron sediment filter capable of holding 5 lbs of sediment. In another example, the bulk filter 70 is capable of holding 20 lbs of sediment. One of ordinary skill in the art will appreciate that a size and a capacity of the bulk filter 70 may be selected according to the size and requirements of the compact drainage system 100. The filtered, treated waste water is then passed through the carbon filter 80.

In one embodiment, the bulk filter 70 and the carbon filter 80 are arranged in series. In another embodiment, the bulk filter 70 and the carbon filter 80 are arranged in parallel. In other embodiments, the compact drainage system 100 may include either the bulk filter 70 or the carbon filter 80, but not both. In yet another embodiment, the compact drainage system 100 may include a valve that allows cleaning effluent from the neutralizer tank 40 and the cleaning cycle to be filtered by a separate filter array (not illustrated) The separate filter array may include a bulk filter, a carbon filter or a combination thereof.

The carbon filter 80 may include activated carbon, coal, charcoal or resin beads configured to remove oxidizing agents from the treated waste water by a physical or chemical adsorption mechanism and to remove dissolved organics by physical adsorption. The activated carbon can be used, for example, as granules or in monolithic block form. The carbon filter 80 is selected to maximize removal of the types of compounds that represent the active drug ingredients in the pharmaceutical waste of the waste influent tank 10. For example, the carbon filter 80 may be an optimized version of a granular activated carbon filter, a coal filter, or a resin bead filter.

After passing through the bulk filter 70 and/or the carbon filter 80, the filtered, treated waste water passes through a check valve to the drain container 90, which is configured to hold and/or discharge the filtered, treated waste water. In one embodiment, the drain container 90 may automatically discharge the filtered, treated waste water to a drain configured to transport the waste water to a waste water treatment facility or publicly owned treatment works when the contents reach a predetermined level or at a scheduled time. In another embodiment, contents of the drain container 90 can be manually disposed of. In some embodiments, an additional filter array including, for example, an additional bulk filter and/or carbon filter may be used to further filter effluent discharged by the drain container 90. The drain container 90 may include permanent fittings configured to discharge the effluent into a drainage system, for example, a hospital plumbing system. As illustrated in FIGS. 7 and 8, the drain container 90 may be disposed external to the housing 120.

Optionally, the compact drainage system 100 may also include a drip pan 110 configured to collect any fluid or solid material that leaks from the compact drainage system 100. The drip pan 110 may span a length of the entire compact drainage system 100, or the drip pan 110 may span a portion of the length of the compact drainage system 100.

In one embodiment, the drip pan 110 may include a leak detector 111 capable of outputting an alarm signal to the control circuit 200 (described in more detail below) when a predetermined level of fluid has been reached in the drip pan 110. The alarm signal may trigger an interlock (not illustrated) that prevents operation of the compact drainage system 100 until the leak has been located and repaired. The alarm signal may be capable of identifying a location of the leak. In another embodiment, the leak detector 111 provides an alternative, visual indicator of a leak, such as a change in color.

The control circuit 200 is configured to execute one or more computer programs to perform actions by operating on input data and generating output. The control circuit 200 includes one or more memory devices for storing instructions and data. The control circuit 200 may be configured to monitor the various system levels detected by the various sensors described above either remotely or locally. In addition, the control circuit 200 may be configured to remotely or locally activate or deactivate one or more of the pumps described above, or open or close a valve disposed in the compact drainage system 100 in order to regulate flow of the waste water through the various components of the compact drainage system 100. This will allow a user to remotely or locally program, for example, an amount of a reagent dispensed per pulse, a number of pulses per reaction or treatment cycle, a duration of a reaction or treatment cycle, a number of cleaning cycles and/or a duration of each cleaning cycle. The control circuit 200 may also be configured to receive alarms from the various sensors described above and start and stop discharge processes accordingly. The control circuit 200 may also be programmed for remote or local execution of system diagnostics or troubleshooting procedures.

The control circuit 200 may be configured to output various system levels, for example, volume dispensed from each container or a level, temperature, or pressure of each container to a user interface 300. In one embodiment, the user interface 300 is configured to allow a user to enter commands to be processed by the control circuit 200. In other embodiment, the user interface 300 is only configured to display information. In some embodiments, all functions of the components of the compact drainage system 100 will be automatic to a user with the exception of placing pharmaceutical waste in the waste influent tank 100 and starting a reaction or treatment cycle. In other words, programming of the control circuit 200 may allow the compact drainage system 100 to complete all functions without user input other than the user filling the waste influent tank 10 with pharmaceutical waste and starting the reaction or treatment cycle. The user interface 300 may include LED lights indicating, for example, whether the compact drainage system 100 is ready to process waste, whether the waste influent tank 10 is full, whether the reagent levels in the hydrogen peroxide container 20 or the aqueous iron container 30 are low, whether any component of the compact drainage system 100 has malfunctioned or whether an incompatible hydrogen peroxide container 20 or aqueous iron container 30 has been installed. In the event that a component of the drainage system 100 has malfunctioned, the user interface 300 may indicate an error code specific to the malfunction.

Any of the operations described herein can be performed by computer-readable (or computer-executable) instructions that are stored on a computer-readable medium such as the memory of the control circuit 200. The computer-readable medium can be a computer memory, database, or other storage medium that is capable of storing such instructions. Upon execution of the computer-readable instructions by a computing device such as the control circuit 200 or a computer in communication with the control circuit 200, the instructions can cause the computing device to perform the operations described herein. For example, the computer-readable medium of the control circuit 200 may tabulate data, maintain data history in the memory, and enable reporting of all functions of each component of the compact drainage system 100. The computer readable medium may be connected to a central processing unit having wireless compatibility.

A chemical reaction utilized to treat the waste water will now be described. One of ordinary skill in the art will appreciate that any known chemical reaction may be utilized to degrade and eliminate pharmaceutical waste by replacing the hydrogen container 20 and the aqueous iron container 30 with the appropriate chemicals. For example, the chemical reaction may include the use of Fenton's reagent as an oxidant for the pharmaceutical waste. In some embodiments, the reaction of the pharmaceutical waste with the Fenton's reagent (hydrogen peroxide and an iron (II) to generate a hydroxyl free radical species) is carried out in the absence of UV light. Accordingly, any system or apparatus described herein may be configured such that it excludes a UV light source, according to some embodiments. As such, the following example is only meant to be illustrative.

EXAMPLE

Ferrous Sulfate Heptahydrate Solution—13.9 grams of ferrous sulfate heptahydrate was weighed and placed into a 50 mL volumetric flask. Water was added to the 50 mL mark and the solution swirled to complete dissolution. The aqueous iron solution was placed in the aqueous iron container 30.

Warfarin sodium solution—1.00 gram of warfarin sodium was weighed into a 500 mL volumetric flask. The warfarin sodium was dissolved in 500 mL of 0.85% saline to provide a concentration of 2 mg/mL.

Diltiazem solution—0.50 gram of diltiazem HCl was weighed into a 500 mL volumetric flask and dissolved into 500 mL of 0.85% saline to provide a concentration of 1 mg/mL.

Hydrocodone solution—1.00 gram hydrocodone bitartrate was weighed into a 500 mL volumetric flask and dissolved into 500 mL of 0.85% saline to provide a concentration of 2 mg/mL.

Prior to the start of the experiment, water was run through the compact drainage system 100 and then pumped through the carbon filter 80. The pH of the carbon filtered water was found to be 3.05. The initial pH of the water was 7.7.

Figure 9:
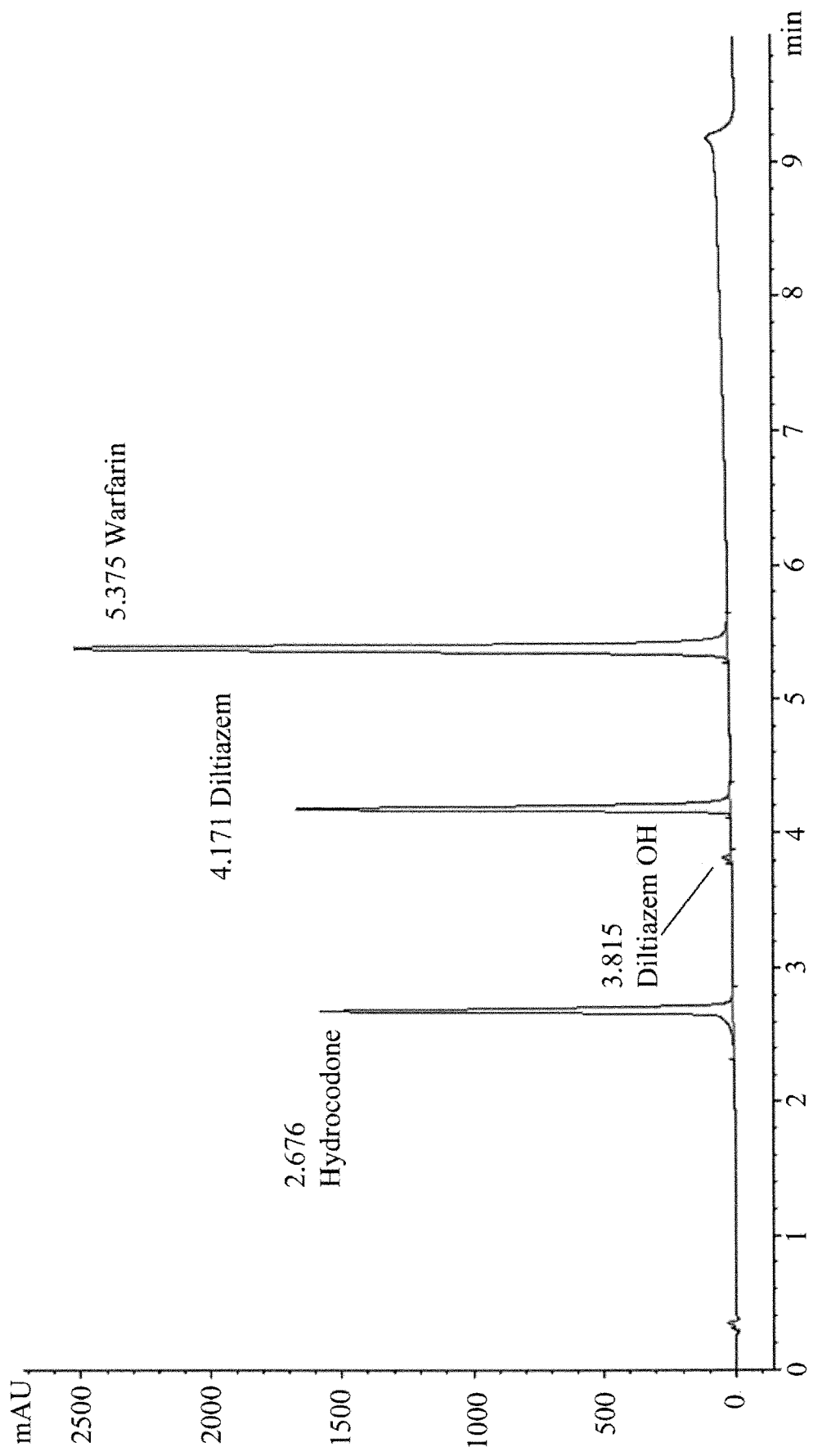
FIG. 9 is a chromatogram illustrating an initial drug mixture, according to an experiment conducted utilizing the compact drainage system of FIG. 1.
Figure 10:
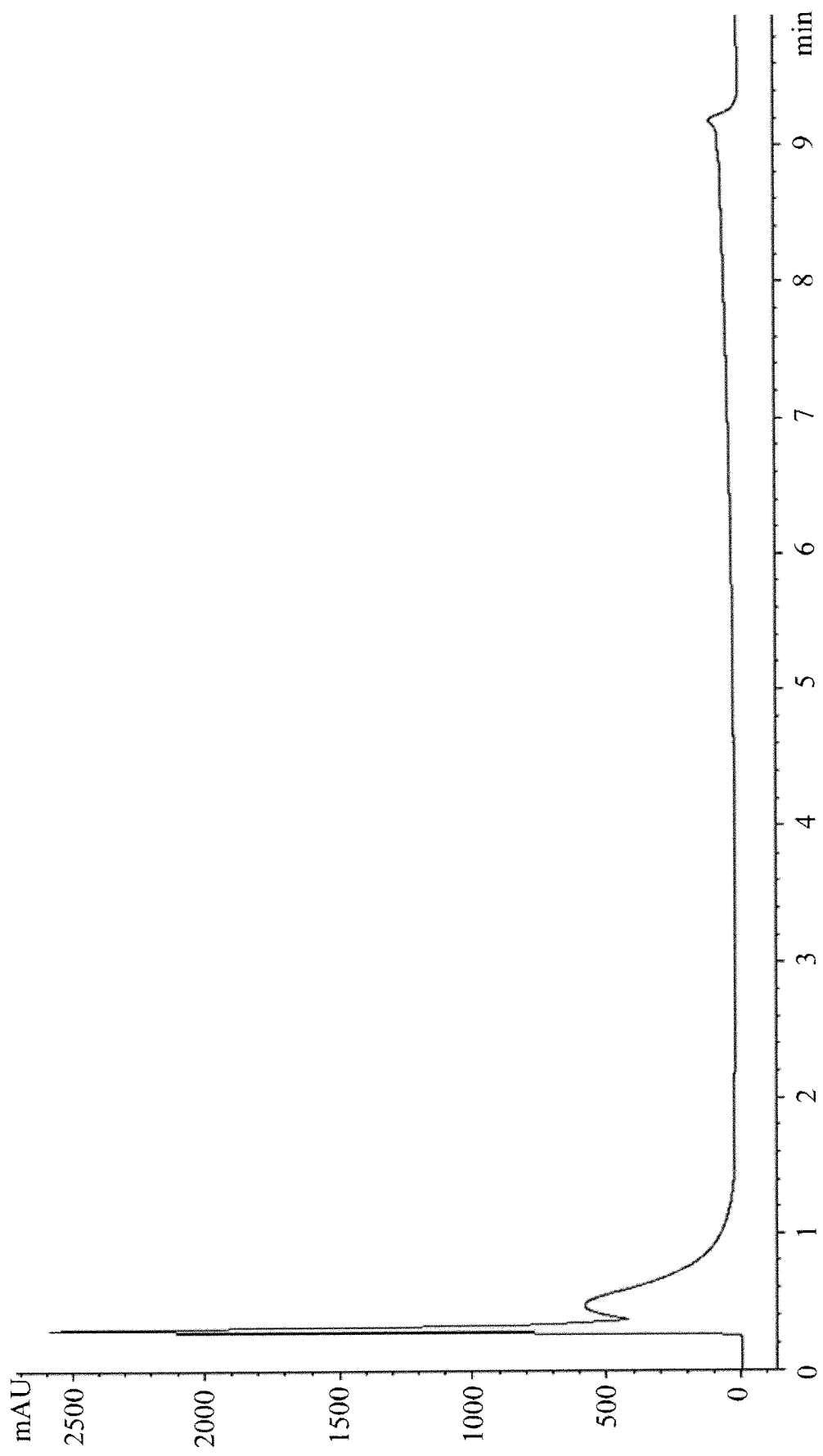
FIG. 10 is a chromatogram illustrating a filtered sample, according to an experiment conducted utilizing the compact drainage system of FIG. 1.

The warfarin sodium solution was poured into a 2 liter Erlenmeyer flask, followed by the hydrocodone solution, then the diltiazem solution resulting in a milky white suspension. The pH was found to be 5.12. The pH was adjusted to 7.97 with 0.2N NaOH resulting in a clear solution. The resulting solution was poured into a waste influent tank of a compact drainage system. A chromatograph of the initial drug mixture is illustrated in FIG. 9. Note that peaks at 2.675, 3.815, 4.171 and 5.375 are clear, corresponding to hydrocodone, diltiazem OH, diltiazem and Warfarin, respectively.

The entire contents of the waste influent tank were pumped into the neutralizer tank 40 and the circulation pump 42 was turned on. A 10 mL aliquot of the solution was removed, filtered, and labeled as t0 (time zero). The total number of mols of drugs was 5.04 mmols. 2.86 mL of hydrogen peroxide (30%) 2.86 mL (25.2 mmols, 5 molar eqs) followed by 12.6 mL of the aqueous iron solution (12.6 mmols, 2.5 molar eqs) were discharged from the hydrogen peroxide container and the aqueous iron container, respectively, and sequentially added to the neutralizer tank. The solution turned brown and cloudy, but a few minutes later it cleared although remaining brown. A sample was obtained at 10 minutes (10 mL aliquot) via syringe and pushed through a 0.45 micron syringe filter into an HPLC vial for analysis and labeled t10. A portion of the circulating mixture was run through the carbon filter and collected.

A second delivery of 2.86 mL of hydrogen peroxide (30%) followed by 12.6 mL of the aqueous iron solution were discharged from the hydrogen peroxide container and the aqueous iron container, respectively, and added to the neutralizer tank sequentially. Some brown foam was observed, but this did not cause any circulation problems. At 20 minutes and 30 minutes a 10 mL aliquot was removed via syringe and pushed through a 0.45 micron syringe filter into a HPLC vial for analysis and labeled t20 and t30, respectively. A portion of the circulating mixture was run through the carbon filter and collected at each time point.

A third delivery of 2.86 mL of hydrogen peroxide (30%) followed by 12.6 mL of the aqueous iron solution were discharged from the hydrogen peroxide container and the aqueous iron container, respectively, and added to the neutralizer tank sequentially. After a total of 40 minutes and 50 minutes, 10 mL aliquots were removed via syringe and pushed through a 0.45 micron syringe filter into a HPLC vial for analysis and labeled t40 and t50, respectively. A portion of the circulating mixture was run through the carbon filter and collected at each time point.

After the experiment, the waste influent tank, the neutralizer tank and all circulation lines were flushed twice with water from the water container and drained.

After the completion of all the sample analyses, the 40 minute filtered sample was run on the LC/MS to determine the extent of the degradation.

Table 1 lists the results of the experiment.

TABLE 1

| Time (minutes) | Drug Concentration | Volume of 30% Peroxide (mL) | Volume of 1N $FeSO_4$ (mL) | Total Peroxide/Drug (Meq) | Peroxide/Fe Ratio | Average % Degraded in Filtered Samples |
|---|---|---|---|---|---|---|
| 10 | 5.04 mM | 1 × 2.86 | 1 × 12.6 | 5 | 2 | 95.2% |
| 20 | 5.04 mM | 2 × 2.86 | 2 × 12.6 | 10 | 2 | 98.5% |
| 30 | 5.04 mM | — | — | 10 | 2 | 98.0% |
| 40 | 5.04 mM | 3 × 2.86 | 3 × 12.6 | 15 | 2 | 100% |

Figure 5:
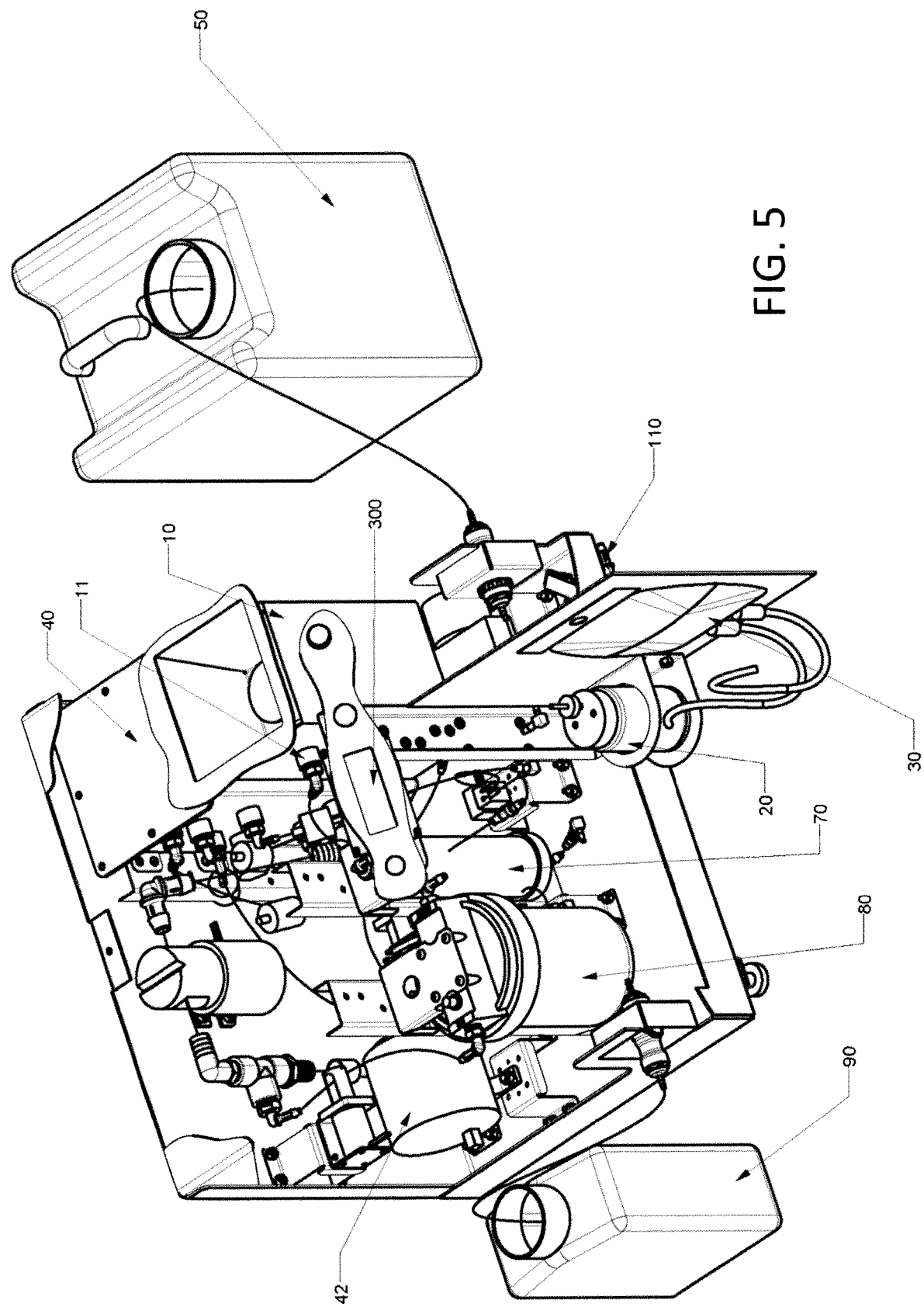
FIG. 5 is a front, perspective view of the compact drainage system with a housing removed, according to the embodiment of FIG. 4.
Figure 6:
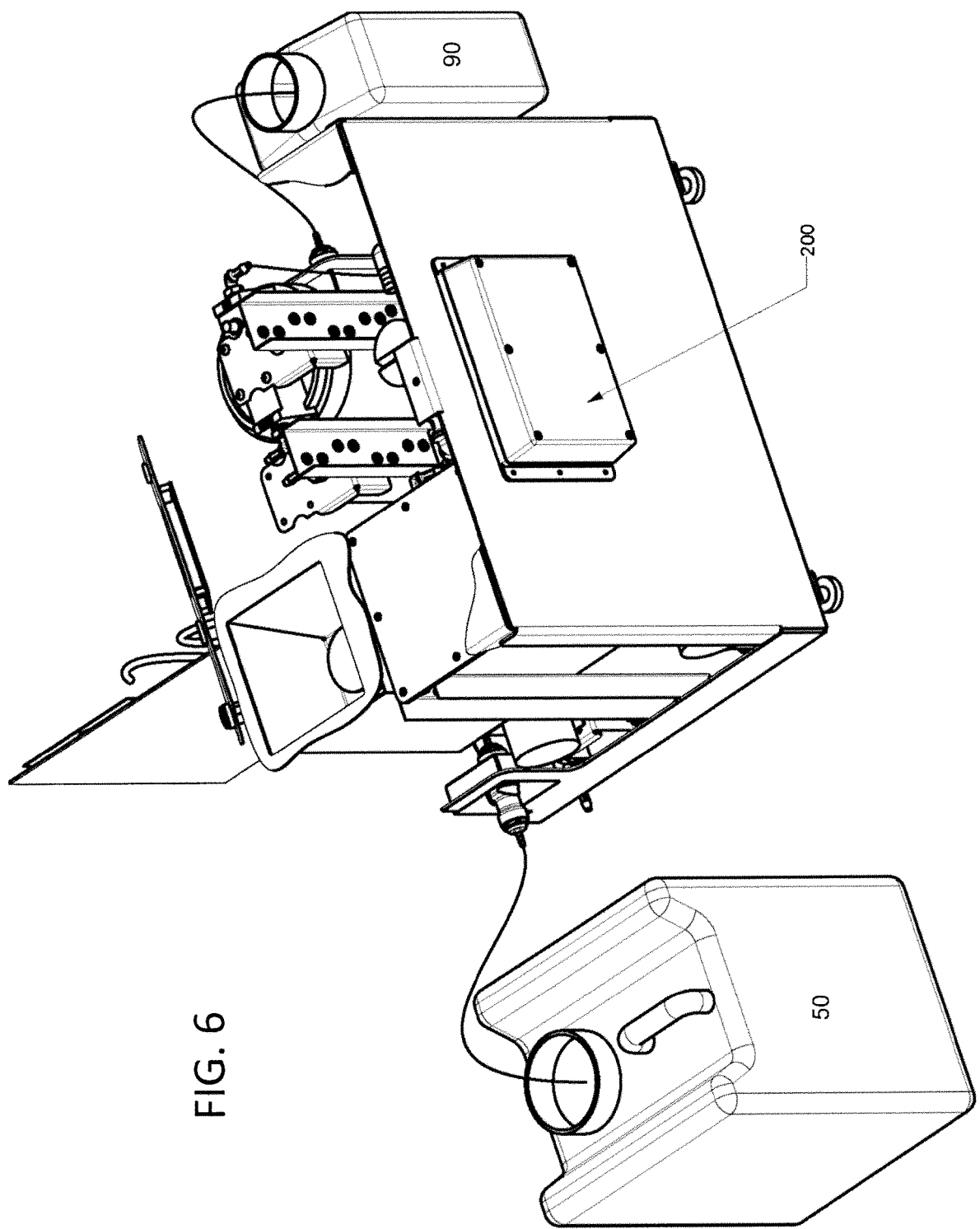
FIG. 6 is a back, perspective view of the compact drainage system with a housing removed, according to the embodiment of FIG. 4.

As seen in Table 1, after 10 minutes, 3.28% hydrocodone, 5.36% diltiazem, and 5.65% warfarin remained in the water. After 20 minutes and the second dose of Fenton's reagent, 0.12% hydrocodone, 1.41% diltiazem, and 3.12% warfarin remained in the water. After 30 minutes, and no additional dose of Fenton's reagent, there was no significant change. After 40 minutes and the third dose of Fenton's reagent, there was no detectable amount remaining of any of the three drugs. A chromatograph of the t40 filtered sample is illustrated in FIG. 5. At the 50 minute time point, the results were the same, and the experiment terminated.

The concentration of drugs remaining in the carbon filtered samples were not significantly different from the results obtained from the samples that were syringe filtered, indicating that carbon filter did not have a significant UV adsorption given the minimal contact time with the carbon.

The Mass Spectrum (MS) analysis results showed a trace amount of a di-oxygenated dilitazem product, which could not be quantified. No other drug related compounds could be found in the MS. The low mass cut off for mass detection is 150 amu, so there were no other drug related products with a mass greater than 150 amu, indicating the drugs were fully degraded to carbon fragments.

From the data obtained in the experiment, at least a 15 fold molar excess of Fenton's reagent is utilized to completely degrade 100% of the drugs. This amount may vary according to the composition of pharmaceutical waste present in the waste influent tank 10.

As demonstrated by the Example above, the compact drainage system 100 is capable of effectively treating pharmaceutical waste at a location at which the pharmaceutical waste is disposed (i.e., at a sink if the pharmaceutical waste is poured down the sink), and by a person that disposed of the pharmaceutical waste. The chemical reaction occurs in the absence of ultraviolet (UV) light.

For the purposes of this disclosure and unless otherwise specified, "a" or "an" means "one or more."

Technical and scientific terms used herein have the meanings commonly understood by one of ordinary skill in the art to which the present invention pertains, unless otherwise defined. Reference is made herein to various methodologies known to those of ordinary skill in the art. Publications and other materials setting forth such known methodologies to which reference is made are incorporated herein by reference in their entireties as though set forth in full. Any suitable materials and/or methods known to those of ordinary skill in the art can be utilized in carrying out the present invention. However, specific materials and methods are described. Materials, reagents and the like to which reference is made in the following description and examples are obtainable from commercial sources, unless otherwise noted.

As used herein, the singular forms "a," "an," and "the" designate both the singular and the plural, unless expressly stated to designate the singular only. Likewise, singular forms of terms designate both the singular and plural, unless expressly stated to designate the singular only.

The term "about" in connection with numerical values and ranges means that the number comprehended is not limited to the exact number set forth herein, and is intended to refer to ranges substantially within the quoted range while not departing from the scope of the invention. As used herein, "about" will be understood by persons of ordinary skill in the art and will vary to some extent on the context in which it is used.

One of ordinary skill in the art will readily realize that all ranges discussed can and do necessarily also describe all subranges therein for all purposes, and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

While some embodiments have been illustrated and described, it should be understood that changes and modifications can be made therein in accordance with ordinary skill in the art without departing from the invention in its broader aspects as defined in the following claims.

What is claimed is:

1. A compact system for treating pharmaceutical waste at a location at which the pharmaceutical waste is disposed, the system comprising:
    a housing having a door, the door of the housing configured to move between an open position and a closed position to allow or deny access to an interior of the housing, the housing containing:
        a waste influent tank configured to hold and discharge a fluid comprising pharmaceutical waste;
        a first container configured to hold and discharge hydrogen peroxide utilized in a chemical reaction to treat the pharmaceutical waste;
        a second container configured to hold and discharge aqueous iron solution utilized in the chemical reaction to treat the pharmaceutical waste;
        a neutralizer tank in which the chemical reaction is carried out;
        a control circuit; and
        at least one sensor provided in at least one of the waste influent tank or the neutralizer tank and configured to measure a level of fluid contained in the at least one of the waste influent tank or the neutralizer tank and output an alarm signal to the control circuit when a predetermined level of fluid in at least one of the waste influent tank or the neutralizer tank is reached, wherein the control circuit, in response to the alarm signal, is configured to prevent additional fluid from being added to the waste influent tank until the level of the fluid in the at least one of the waste influent tank or the neutralizer tank is reduced below the predetermined level.

2. The compact system of claim 1, wherein an inlet of the waste influent tank is disposed in a top surface of the housing to allow the pharmaceutical waste to be introduced to the waste influent tank even when the door of the housing is in the closed position.

3. The compact system of claim 1, wherein at least one of the first container or the second container includes a composite bar code, linear bar code or RFID used to verify an authenticity of the at least one of the first container or the second container and contents thereof.

4. The compact system of claim 1, wherein at least one of the first container or the second container is provided in a compartment or on a shelf mounted to the door of the housing.

5. The compact system of claim 1, further comprising:
    at least one second sensor configured to measure a level, a pressure, or a temperature of the first container or the second container.

6. The compact system of claim 1, further comprising:
    at least one pump located downstream of the waste influent tank;
    the at least one pump configured to transport contents of one of the waste influent tank, the first container, the second container, or the neutralizer tank at a predetermined rate.

7. The compact system of claim 6, wherein:
    the at least one pump is configured to transport the contents of the waste influent tank at the predetermined rate, and
    the at least one pump is activated automatically when the level of the fluid contained in the waste influent tank reaches a predetermined level.

8. The compact system of claim 6, wherein:
the at least one pump is configured to transport the contents of the waste influent tank at the predetermined rate, and
the at least one pump is configured to operate in an always on mode in which the contents of the waste influent tank are pumped to the neutralizer tank immediately upon entering the waste influent tank.

9. The compact system of claim 1, further comprising:
a user interface configured to display at least one of a volume dispensed from, a level, a temperature or a pressure of at least one of the waste influent tank, the first container, the second container, or the neutralizer tank.

10. The compact system of claim 9, wherein the user interface is further configured to display an error code identifying a malfunction in the compact system.

11. The compact system of claim 1, further comprising:
a water container downstream of the neutralizer tank, the water container configured to hold and discharge water that mixes with treated fluid discharged from the neutralizer tank to further dilute the treated fluid.

12. The compact system of claim 1, further comprising:
a water container upstream of the waste influent tank, the water container configured to hold and discharge water to the waste influent tank or the neutralizer tank.

13. The compact system of claim 1, further comprising:
a drip pan configured to collect any fluid or solid material that leaks from the compact system; and
a leak detector configured to indicate that a predetermined level has been reached in the drip pan.

14. A method of treating pharmaceutical waste, the method comprising:
performing a treatment cycle comprising:
providing pharmaceutical waste in a waste influent tank;
providing hydrogen peroxide in a first container, the hydrogen peroxide configured to be utilized in a chemical reaction to treat the pharmaceutical waste;
providing aqueous iron solution in a second container, the aqueous iron solution configured to be utilized in the chemical reaction to treat the pharmaceutical waste;
discharging each of the pharmaceutical waste, the hydrogen peroxide and the aqueous iron solution to a neutralizer tank via independent supply lines;
carrying out a chemical reaction between the pharmaceutical waste, the hydrogen peroxide and the aqueous iron solution within the neutralizer tank;
measuring a level of the fluid contained in at least one of the waste influent tank or the neutralizer tank;
outputting an alarm signal to a control circuit when a predetermined level of fluid in the at least one of the waste influent tank or the neutralizer tank is reached; and
preventing additional fluid from being added to the waste influent tank until the level of the fluid in the at least one of the waste influent tank or the neutralizer tank is reduced below a predetermined level, wherein:
the waste influent tank, the first container, the second container and the neutralizer tank are provided in a housing having a door, and
the door of the housing is configured to move between an open position and a closed position to allow or deny access to an interior of the housing.

15. The method of claim 14, further comprising repeating the treatment cycle for a predetermined number of times.

16. The method of claim 15, further comprising executing a program to control an amount of the hydrogen peroxide or the aqueous iron solution dispensed in a pulse, a number of pulses per treatment cycle, or a duration of each treatment cycle.

* * * * *